Figures 7, 8:
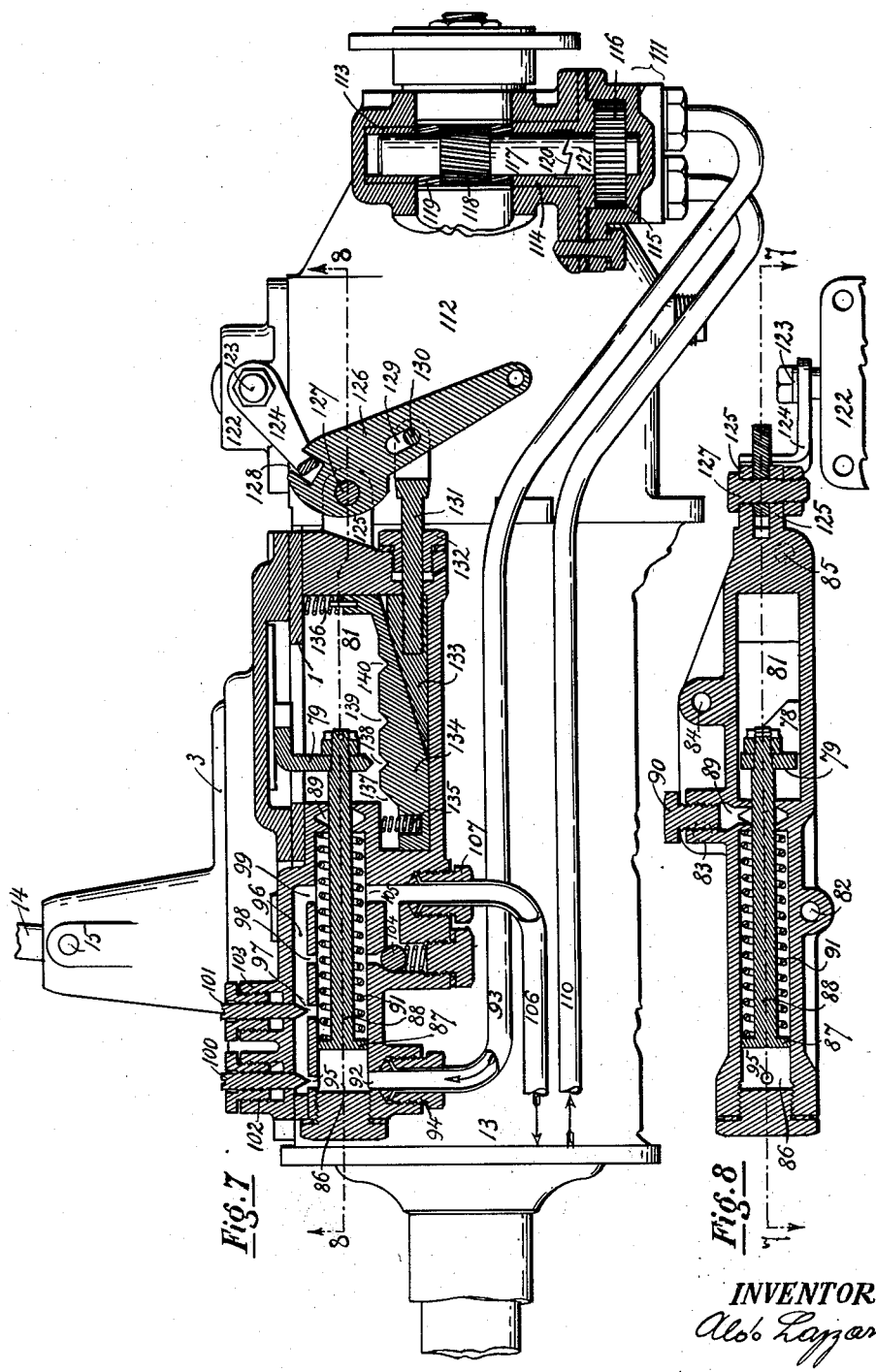

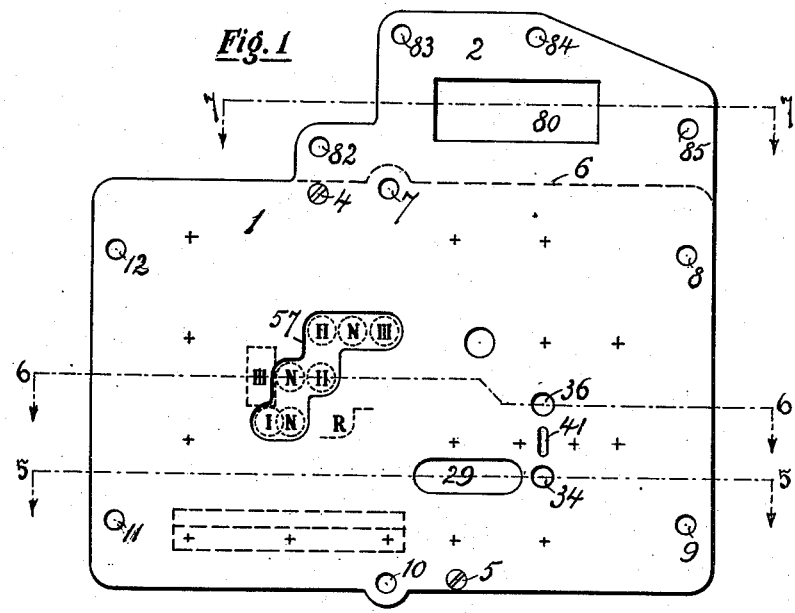

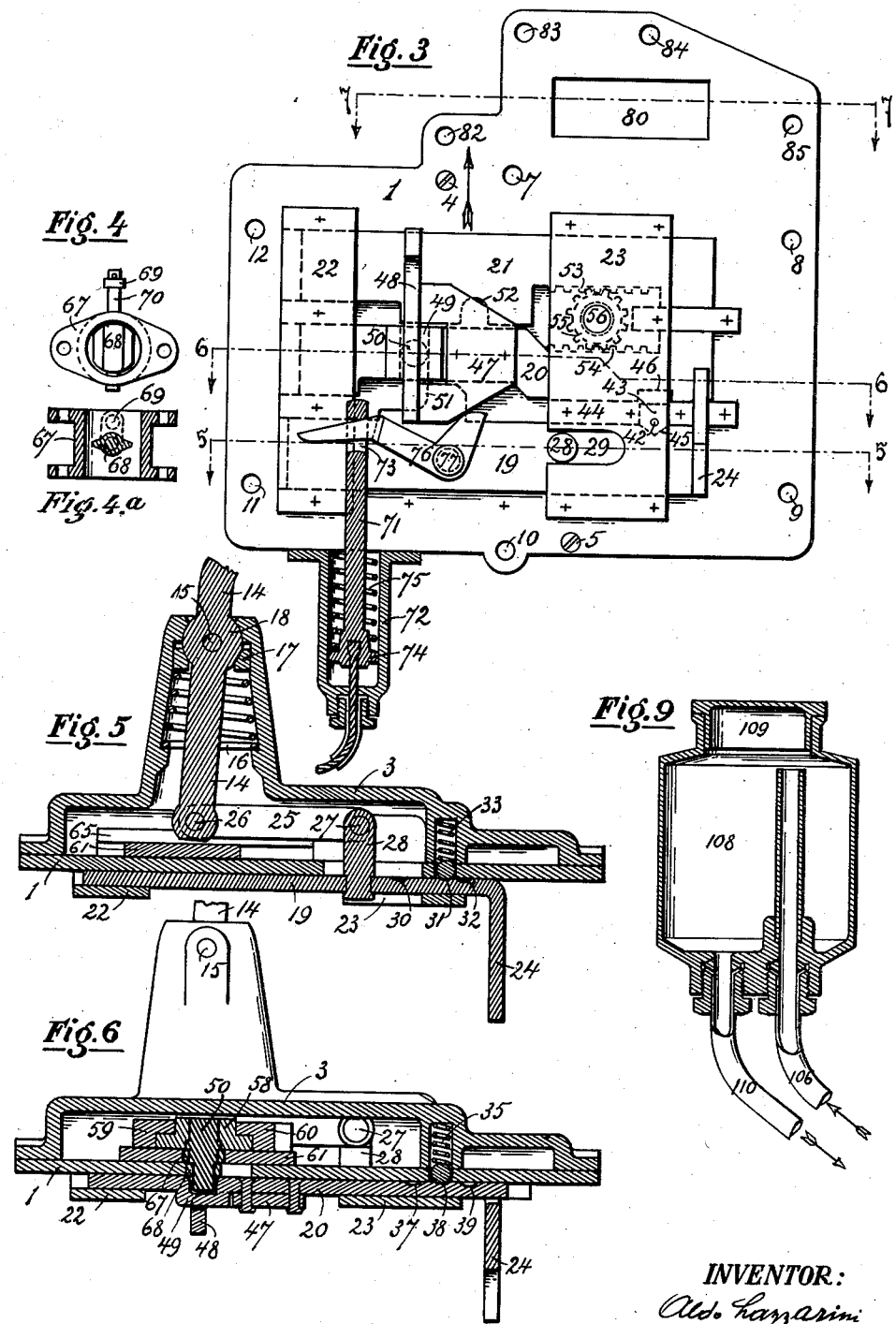

Sept. 24, 1935. A. LAZZARINI 2,015,116
AUTOMATIC GEAR SHIFTER FOR AUTOMOBILE TRANSMISSIONS
Filed Jan. 7, 1935 4 Sheets-Sheet 3

INVENTOR:
Aldo Lazzarini

INVENTOR:
Aldo Lazzarini

Patented Sept. 24, 1935

2,015,116

UNITED STATES PATENT OFFICE 2,015,116

AUTOMATIC GEAR SHIFTER FOR AUTOMOBILE TRANSMISSIONS

Aldo Lazzarini, Flushing, N. Y.

Application January 7, 1935, Serial No. 602

15 Claims. (Cl. 74—336.5)

This invention relates to the controls of the transmission of automobiles or other self propelled vehicle, where the relative speeds of the propelling motor and the driving wheels is to be varied to suit all running conditions, by effecting the shifting of the driving gears automatically instead of manually as almost generally done.

The principal object of this invention is therefore to dispense with the operation of the manual universal shifter and supplant it with corresponding automatic means while retaining the existing transmission gearing. The advantages of the well tried and satisfactory performance and ruggedness of the standard transmission gearing are thus taken advantage of while doing away with the shortcomings of the manual controls which require the attention of the operator and the use of one of his arms often when both his attention and use of his limbs are most needed to the purpose of steering or other driving operations.

An important advantage of this invention is also its adaptability of application to a gear shift transmission at the option of the vehicle's purchaser, by simply substituting the transmission cover to which either the manual shifter or the automatic shifter here described are attached, and by including or excluding other subsidiary parts as will be hereinafter explained.

A further object of my invention is to enable the operator through the moving of a lever to set a lock which will retain any speed ratio that has been last set in operation by the automatic mechanism, for an indefinite time, said lock operating in conjunction with the rigid coupling of the free-wheeling clutch. This facility is of great importance when descending a steep grade, as the operator may thus employ to advantage the pneumatic braking characteristic of a throttle-choked gasoline motor.

The impulse for the automatic operation of my invention may be furnished by any of the many known means, like centrifugal force, fluid pressure, air pressure, vacuum, electro-magnetic force or a combination of two or more of the same means. Any such means as may be employed will operate from the speed of the vehicle, not from the speed of the motor-shaft, as it must be the accelerating ability of the former that will determine the quantity of the impulse produced by the system which is employed. The increase or decrease of such quantity to and from certain predetermined values will establish the successive selection of the speed ratios of the transmission gearing.

Any point of a vehicle transmission which turns in direct relation to the speed of the wheels may be chosen for connecting the impulse producing device of the type employed. The accompanying drawings illustrate the adoption of a fluid pressure gear-pump. This is what I prefer to all other means, but since it is not claimed in this patent as an invention in itself, it will merely serve as an incidental illustration.

The controlling elements which constitute this invention are designed in the particular form herein described to operate automatically in conjunction with the action of a free-wheeling clutch. Another desirable condition for the smooth operation of this invention is that the gear transmission be provided with a synchro-mesh clutch for the intermediate and the high-speed connections. The greatest number of standard transmissions of modern cars are provided with the above improvements.

In order to make as clear as possible the following description, may I point out that the use of the term "forward" or "ahead" indicates a movement towards the front of the vehicle on which the mechanism is imagined to be applied; the term "backwards" or "rearwards" is a movement toward the rear of the vehicle. In all views of the drawings, the "front" of the mechanism is towards the left side of the onlooker. All the plan views of the drawings are taken looking upwards, since that is the best way to show the essential parts of this invention, their location being right beneath the cover of the transmission box. Therefore, the left side of said parts is towards the upper margin of the drawing, and the right towards the lower margin. In order to avoid confusion, the identification of a side movement is referred to the arrow shown on said plan views as "in the direction of the arrow" or "against the direction of the arrow".

An arrangement of the parts of my invention is illustrated in the accompanying drawings, in which Fig. 1 is a plan view of the under face of a base-plate, which serves as a support to most of the essential elements of this invention but which is shown devoid of the said supported elements; Fig. 2 is a view of the internal face or under side of the transmission box cover which will enclose all said elements; Fig. 3 is a plan view of the under face of the base-plate with all parts supported on such under face. This figure also shows the horizontal plan section of certain auxiliary means attached to the side wall of the gear-box.

Fig. 4 shows a transverse view of a butterfly valve for the explosive gasoline-air mixture, operated by the automatic transmission, and Fig. 4a shows a vertical section of the same butterfly valve.

Fig. 5 is a longitudinal vertical section of the cover, base-plate, and enclosed and supported moving parts, along line 5—5 of Figs. 1 and 2. Fig. 6 is a section parallel to the above along line 6—6 of Figs. 1 and 2. Fig. 7 is a section parallel to the above along line 7—7 of Figs. 1 and 2 of a cylinder and auxiliary parts extending alongside of the transmission box. This figure also shows a broken off view of a gear pump located at the rear extremity of the free-wheeling box. Fig. 8 is a horizontal section of the same cylinder as taken along line 8—8 of Fig. 7 and looking upwardly. Fig. 9 is a vertical section of a fluid reservoir and Figs. 10 to 15 are plan views similar to Fig. 3 of the positions which three essential elements of the mechanism assume when the transmission is in different speed positions.

In Fig. 1 base-plate 1 has an outline adapted to fit on three sides with the top opening of a gear transmission box. This base-plate extends outwardly of the gear box on the fourth side, forming a projection 2 adapted to support the cylinder shown at Fig. 7.

The cover 3 shown at Fig. 2 has exactly the same outline as base-plate 1. Screws 4 and 5 will secure the base-plate to the cover. Fig. 7 shows how the base-plate will be interposed between the cover and the gear transmission box when the cover will be bolted to the latter. The dotted line 6 of Fig. 1 indicates where the edge of said box will lie under the over-extended side of the base-plate. Holes 7, 8, 9, 10, 11 and 12 of both cover and base-plate will receive the bolts threaded into the top edges of gear-box 13 shown in Fig. 7. The cover 3 is provided with appropriate cavities to accommodate the various parts which will be soon described, one of said cavities being of conical shape and similar to the one accommodating the universal lever of general practice. The lever 14 is not, however, a universal lever, since its motion is limited to a straight vertical plane, any side movement being prevented by cross-pin 15. Conical spring 16 has the sole purpose of pressing the washer 17 against the bulb 18 of the lever, therefore causing an oil-tight fitting.

Guided on the under face of base-plate 1 are three slide-plates 19, 20 and 21 (see Fig. 3) which may slide side by side in longitudinal direction. Two track-plates 22 and 23 riveted to the base-plate hold the three slide-plates in their course by means for their ridges shown with dotted lines. The slide-plate 19 terminates at its rear extremity with a fork 24, which in the usual manner will cause the shifting of that gear of a standard transmission which provides either the reverse speed or the low speed connections besides the neutral or disengaged position. An articulate connection between the hand-lever 14 and the slide-plate 19 (see Fig. 5) is made with a link-arm 25 at the ends of which pin 26 attaches it to the lower extremity of hand-lever 14 and pin 27 attaches it to a stud 28, the later being riveted to slide-plate 19. An oblong slot 29 in either the base-plate (Fig. 2) and the track-plate 23 (Fig. 3) provides the necessary clearance to the movement of stud 28.

The function of hand-lever 14 is that of setting either the neutral or disengaged position, the reverse speed connection and the low speed connection, which is done manually in the usual way. Notches 30, 31 and 32 adapted to catch the ball of the spring-and-ball latch 33 will define the respective positions of slide-plate 19 as that of reverse-speed when the ball is seated in notch 30, as that of neutral or disengaged condition when the ball is seated in notch 31 (Fig. 5 shows this particular position), and that of low speed, when the ball is seated in notch 32. The spring-and-ball latch 33 is located in an appropriate cavity of cover 3, and hole 34 (see Fig. 1) of base-plate 3 conjoins it as to allow access of the ball to the particular notch of slide-plate 19 which falls in line.

Another spring-and-ball latch indicated in Figs. 2 and 6 with the numeral 35 will similarly hold through hole 36 of the base-plate the adjacent slide-plate 20 in either one of three positions defined by notches 37, 38 and 39 indicated in Fig. 6. When the ball of this latch is seated in notch 37 the position of slide-plate 20 is that of intermediate speed, when it is seated in notch 38 the position is that of neutral or disengaged condition, when it is seated in notch 39 the position of the slide-plate is that of high-speed. In between the drilled cavities holding the two spring-and-ball latches just described there is an oblong cavity 40 (see Fig. 2) designed to hold an angular spring having the looped head set into the cavity itself and the flecting tips resting on the cavity walls towards the opposite spring-and-ball latches. The flecting tip on the side of latch 33 projects from cavity 40, passes through the clearance slot 41 of base-plate 3 (see Fig. 1) and is held in hole 42 of the safety lock piece 43 indicated in Fig. 3. This lock could not be seen unless the guiding track-plate 23 is removed, thence the reason of showing it with dotted lines. The seat of the locking piece is within a cross-track cut into the ridge 44 of the track-plate, thus being imprisoned between said track-plate and the base-plate with liberty of crosswise movement. The outline of the locking piece converges to a point towards slide-plate 19 and is square towards slide-plate 20. Normally, said locking piece is held by the long tip of angular spring 40 pressed against the side edge of slide-plate 19 where a V shaped notch 45 will eventually catch the pointed portion of the locking piece.

Slide-plate 20 is provided on the adjacent edge with a square notch 46 designed to let the locking piece back into it when the slide-plate 19 is moved and the V shaped notch 45 is shifted out of line of the locking piece.

It is clear that by the operation of locking piece 43 only one of the two slide-plates 19 and 20 may be shifted at one time and that due to the location of the notches, any of the two slide-plates may be shifted only when the other is set into the position resulting in the neutral or disengaged condition of the gear it effects. The very purpose of this lock is thus to prevent the possibility of meshing more than one couple of gears in the transmission, which, if it should accidentally happen, would cause serious breakage.

Heretofore it has been proposed to use a safety lock operated exclusively by the thrust imparted by V notches on both slide-plates. I prefer the adoption of the spring lock above described because it practically eliminates the play of movement which must be tolerated for the two slide-plates with the application of the springless safety-lock.

Slide-plate 20 is shown in Fig. 3 and Fig. 6 as being provided with another plate 47 superimposed and riveted to it, said plate 47 being bent to form a fork 48 which will correspond to the fork of a standard transmission that is used to operate the synchro-mesh clutch for establishing either the intermediate speed drive or the high speed drive besides the neutral or disengaged position.

Slide-plate 20 is also provided with an inverted yoke portion 49 (see Fig. 6), the purpose of which is to receive the end of shifter-pin 50 and still allow its passage in the crosswise direction. Slide-plate 19 has adjacently to said yoke-portion 49 a recess 51 forming an abutment for the same shifter-pin 50 as the latter will eventually confine itself into said recess under certain conditions of its operation. Similarly, slide-plate 21, adjacently to yoke portion 49, has a recess 52 forming a receptacle for said shifter-pin, which may likewise confine itself into it under other conditions of its operation.

Slide-plate 21, unlike the other two slide-plates, has no fork attached to it, and its function is not that of directly effecting any gear shifting. It has, however, a rack-portion 53 facing a similar rack-portion 54 of slide-plate 20, both racks being permanently engaged to gear 55. The latter may turn upon a stationary pivot 56 imprisoned between the base-plate 1 and the track-plate 23. Thus the slide-plates 20 and 21 will move at the same time but in opposite directions.

Fig. 1 shows the base-plate 1 as provided with a cut-out pattern 57 corresponding to the often used H pattern of the standard shifter. The outline of this pattern is different, however, as it is formed by a continuous stepping down or zig-zag outline.

Several dotted circles are also shown within said pattern, each with a symbol. They represent the various positions which the shifter-pin 50 may assume in the course of its operation, and the symbols will signify: I, the low-speed position; N, the neutral; II, the intermediate-speed, and III, the high-speed position. The symbol R is outside of the cut-out pattern and represents the position of the abutment 51 of slide-plate 19 when said plate is manually set for the reverse-speed. The symbol III, which is outside of the cut-out pattern, represents the position of the empty yoke-portion 49 of slide-plate 20 after said slide-plate has been shifted ahead to the high speed position by the action of slide-plate 21 upon gear 55 and as a result of said slide-plate 21 having been impelled by shifter-pin 50 to its rearmost position.

It is apparent then, that the two slide-plates 19 and 20 may assume positions exactly corresponding to the positions of the two fork-carriers, often called selector rods or selector plates used in standard manual H shifters. This is as it must be, if this invention is to be applicable to a standard gear-transmission. But while the two slide-plates 19 and 20, carrying the gear shifting forks, will move in the conventional way, their movement is the result of the mechanical transformation of the step-down or step-up movement of shifter-pin 50. Said shifter-pin delivers the mechanically transformed longitudinal movement of a shifter-carrier plate soon to be described.

The shifter-pin 50 (see Fig. 6) is rigidly secured to and carried by cross-slide 58, which is guided by two rails 59 and 60 riveted to the upper face of shifter-carrier 61. In Fig. 2 these two rails, as well as the cross-slide, are indicated with dotted lines on account of their location being onto the top face of the shifter-carrier 61, since Fig. 2 is a view from under looking upwards.

The shifter-carrier plate 61 is capable of longitudinal sliding motion within side-guides 62 and 63, top-guide 64 of the cover 3, and rail 65, which is riveted to the upper face of base-plate 3. Notice that the pair of rails 59 and 60 are riveted to the shifter-carrier plate 61 in an oblique fashion. This is in order to impart a crosswise thrust to the cross-slide 58 whenever the shifter-carrier plate 61 is moved along its longitudinal track and an obstacle blocks a similar movement of the shifter-pin 50. An oblong slot 66 is provided on the shifter-carrier plate 61 in order to clear the movements of shifter-pin 50, as the latter must project through the shifter-carrier plate, and the cut-out pattern of the base-plate 3 to reach the receptacles or yoke portion of either slide-plates 19, 20 and 21. The shifter-pin 50 carries two rollers in line 67 and 68, which will eliminate some of the friction of the pin against either the sides of slot 66 and the edges of the cut-out pattern 57 of the base-plate.

As a result of the combined operation of the shifter-carrier plate moving longitudinally, the cross-slide plate with the shifter-pin moving crosswise, and the effect of the oblique rails of said cross-slide, and the boundary of movement established by the cut-out pattern of base-plate 3, a stepping down motion will be produced on the shifter pin, causing the same to lodge its lower extremity successively into the receptacles and yoke-portion of the three slide-plates 19, 20 and 21.

It is important at this point that I direct attention to the relationship of operation of the three slide-plates 19, 20 and 21.

Figs. 10 to 15 illustrate the different positions assumed by the said three slide-plates when they effect different speeds within the transmission gearing. In these figures all parts associated to the operation of said slide-plates which may obstruct their full view or otherwise tend to complicate the drawing, are removed. The middle plate 20 is shown without the superimposed plate 47 and the fork 48, which are shown in Fig. 3. A dotted outline of the cut-out pattern 57 is indicated in all six figures so that a direct relationship of the changing positions of the shifter-pin 50 in respect to the same pattern may be readily surveyed.

Figure 15:
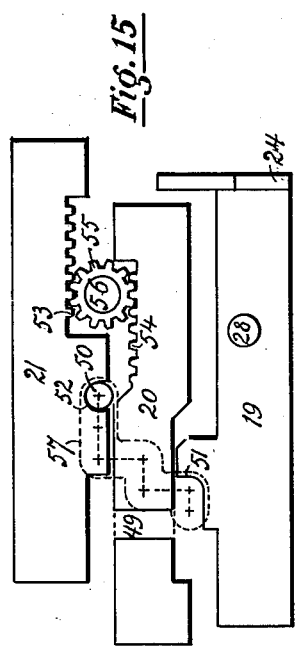
Figure 14:
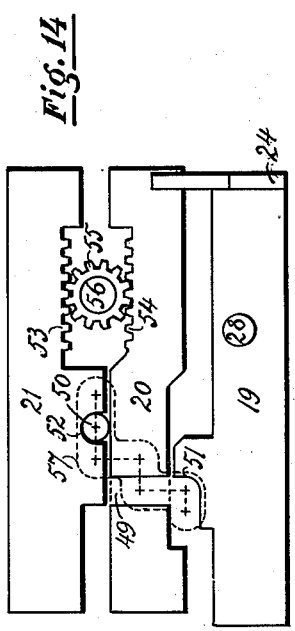
Figure 13:
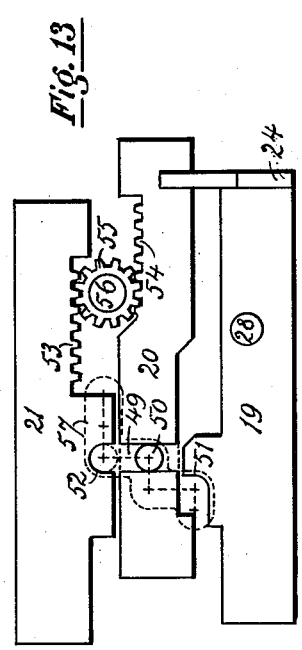
Figure 12:
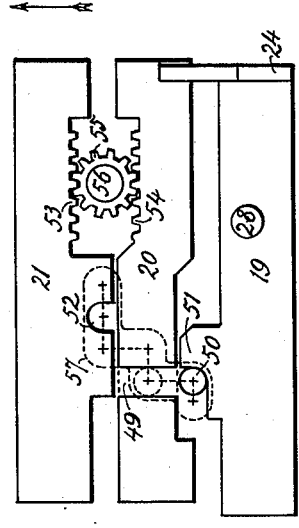
Figure 11:
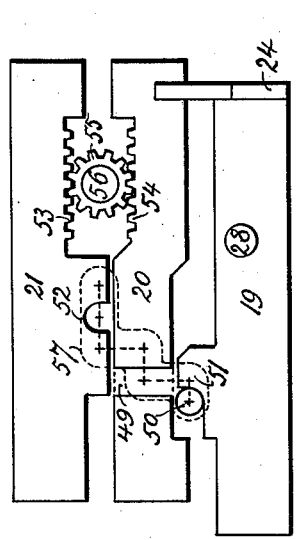
Figure 10:
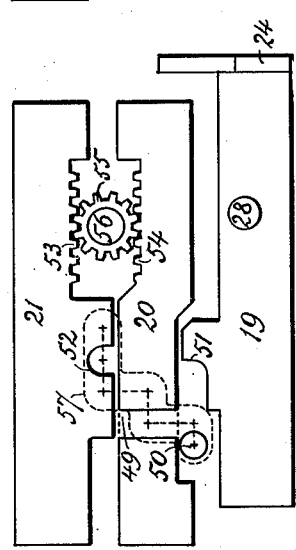

Figs. 10, 11 and 12 show the operation of slide-plate 19, while slide-plates 20 and 21 are held in the neutral position. Figs. 13, 14 and 15 show instead the operation of the two slide-plates 20 and 21, while the former (plate 19) is held stationary in the neutral position.

Fig. 10 indicates the position of slide plate 19 as set for the reverse-speed. Notice that shifter-pin 50 is left at the forward-most position of the cut-out pattern independently from the full backward displacement imparted to slide-plate 19 through the manual operation of the lever 14 and the link heading to stud-pin 28.

Fig. 11 indicates the position of slide-plate 19 as set for the low-speed. Shifter-pin 50 is still retained at its forward-most position, but slide-plate 19 is also displaced as far ahead as possible, again through the operation of the manual lever 14. An intermediate position to the above may be obtained manually for the neutral or disengaged condition of the gears. Such position is similar to the one shown in Fig. 12, the only difference being that the shifter-pin 50 would be at its forward-most position instead of being placed against the abutting projection of slide-plate 19.

As it is, Fig. 12 illustrates the same neutral position as caused by the automatic operation of the mechanism. Assuming that the vehicle has been set in motion after the transmission was manually set for the low-speed as indicated in Fig. 11, said vehicle will gradually acquire a certain momentum. The resulting increase in the rate of its motion will develop a proportionate increase in the output of impulse produced by the device used for such purpose. Said impulse will prompt the displacement in the rearward direction of shifter-pin 50, which abutting against the projection 51 of slide-plate 19 will cause said plate to shift over to the neutral position. The spring-and-ball latch 33, having in the meantime snapped the ball into notch 31, will temporarily hold the slide-plate 19 in the latter position. The same backward impulse which has caused the aforesaid movement of shifter-pin 50 and slide-plate 19 would still carry said members further back, but the outline of the cut-out pattern 57 interferes with said direction, therefore, shifter-pin 50 is carried sidewise in the direction of the arrow by the side thrust developed on account of the angle of the oblique rails 59 and 60 upon cross-slide 57. As a result, shifter-pin 50 is transferred from abutting recess 51 of slide-plate 19 to the yoke-portion 49 of slide-plate 20 as shown by the dotted circles of Fig. 12 and Fig. 3. The latter figure, in fact, illustrates all related parts in this particular position, namely, the neutral. Slide-plate 20 has been held so far in said position by its own spring-and-ball latch 35, the ball being seated into notch 36. The vehicle is presently running on its own momentum, and the excess of impulse applied upon shifter-pin 50, which caused the latter's movement, has not yet spent itself since the momentum of the vehicle keeps on producing it at about the same rate. The shifter-pin will thus be pressed against the outline of the cut-out pattern and its motion directed again towards the rear of the transmission, carrying slide-plate 20 another step with it to the intermediate-speed position as shown in Fig. 13. The safety lock will prevent at this juncture any movement of slide-plate 19 due to the offset position assumed by the square notch 46 in respect to the locking-piece 46 (see Fig. 3). At the same time that slide-plate 20 together with the shifter-pin 50 has moved from the neutral to the intermediate-speed position, slide-plate 21 has moved counter-wise on account of the racks and gear connection, setting its receptacle 52 in line with the yoke-portion 49. The intermediate speed position thus obtained will be maintained as long as the rate of impulse exercised upon shifter-pin 50 remains stationary. By raising the engine's motive power, the vehicle's speed will be increased, resulting in a still augmented impulse upon shifter-pin 50. The latter, due to the restraining outline of the cut-out pattern 57 and the side thrust induced upon it by the oblique slide 58, will divert its direction again as pointed by the arrow, thus causing its position to be transferred over to receptacle 52 of slide-plate 21. At this point, not being able to further move sidewise, it will resume its backward movement and carry slide-plate 21 to the position shown by Fig. 14. This position is neutral again because the backward movement of slide-plate 21 has resulted in slide-plate 20 returning to it, due to the racks and gear connection between the two slide-plates. The vehicle is thus running again solely on its own momentum, but as such momentum was built up to develop an excess of impulse capable of still carrying the shifter-pin further back, another backward movement of said pin will cause shifter-plate 21 to be displaced to a rearmost position shown in Fig. 15. As a result of the backward displacement of said plate 21, the rack and gear connection relating its movements to those of plate 20 will result in the displacement of the latter to its forward-most position, which corresponds to the high-speed or direct drive of the transmission.

With the reversing of said direction of the shifter-pin, as caused by the decrease of impulse exercised upon it by the slowing down of the vehicle, the reverse sequence will occur, namely, from the high-speed position to neutral, followed by the intermediate-speed position and finally the neutral again.

I do not recommend that the automatic return should go further to the low-speed because that would necessitate the introduction of a synchro-mesh clutch for the low-speed gear within the transmission. An automobile hardly ever needs to run on low-speed gear except when starting from a stationary condition. When starting, it is necessary to set the low speed by manual means in order to develop the vehicle motion upon which the automatic transmission depends for its operation. Furthermore, should the automatic transmission extend the automatic return to the low speed, and the vehicle should have to be subsequently stopped, a manual operation would be necessary to place the transmission in neutral position, or the main clutch would have to be disconnected by means of the foot lever. It is just as well then to let the transmission remain in the neutral position rather than cause it to go from the neutral position to the first speed, then stop and subsequently have to manually set the neutral position again. It is to this end that the recess forming the abutment 51 of slide-plate 19 is open forwardly to let the shifter-pin free to step ahead independently of slide-plate 19 remaining in the neutral position.

With an automatic transmission of the type herein described, it is advisable to employ auxiliary means with which to automatically reduce to minimum the amount of the carburated mixture admitted into the motor cylinders when the transmission shifting mechanism is going through the neutral or disengaged position.

In standard vehicles the operator does it by lifting the accelerator foot-lever, but with an automatic transmission he very likely would be taken unaware and the motor being suddenly relieved of the transmission load would at once surge into a loose race.

Between the carburator and the intake manifold of the motor is interposed a short flanged tube 67 enclosing a butterfly shutter 68 (see Fig. 4). This shutter when in the transverse position does not cut off entirely the flow of carburated mixture but curtails it to the point of barely maintaining the motor in motion; the full flow of mixture may be admitted to the motor by the shutter being swung open either one way or the other.

It is to be understood that this butterfly shutter is extra to the shutter of the carburator proper, which will still be operated by pressing or lifting the accelerator lever. It is evident that if the automatic shutter operated by the transmission is closed, the pressing of the accelerator lever will be to no avail, while when the automatic shutter is open, the accelerator will operate normally.

Lever 69 is attached to the outer extension of pin 70, the pin being keyed to the shutter. A cable or rod linkage connects the angular movement of lever 69 to the linear movement of rod 71 (see Fig. 3), which is enclosed in a flanged sleeve 72 bolted to one side of the transmission box, and passes through the wall of said box terminating in its interior with a needle eye slot 73. The part of rod 71 which is confined within sleeve 72 carries a collar 74, and retains expansion spring 75 between said collar and the wall of the transmission box.

An elbow lever 76 is movable upon a fulcrum 77 made of a rivet inserted into slide-plate 19. The longer arm of lever 76 passes through the needle eye slot 73 of rod 71, and the shorter arm of the same lever is adapted to slide on the edge of plate 47, which is riveted to slide-plate 20. Said edge operates as a cam upon the elbow lever with either the movement of slide-plate 19 or slide-plate 20, and the resultant oscillation of lever 76 will move rod 71 to either one of three positions: over toward the transmission box, at the opposite extreme point, or at an intermediate point. The latter position will correspond to the neutral or disengaged condition of the transmission, the other two positions to the different speeds. Through the linkage operating the butterfly-shutter, the median position of the rod 71 will cause said butterfly-shutter to be in the horizontal curtailing position, and the extreme positions of rod 71 one way or the other, will cause the butterfly-shutter to be open.

The means for delivering the impulse effecting the longitudinal displacement of the shifter-carrier plate 61 is located under the extension 2 of the base-plate 1. The shifter-carrier plate 61 (Fig. 2) is provided with an extended arm 78, which is prolonged into a vertical appendix 79. A clearing slot 80 is cut in the base-plate 1 so that the vertical appendix 79 may reach into the compartment 81 of the cylinder block shown in Figs. 7 and 8. Figs. 7 and 8 show how said cylinder block may be bolted to the underface of the extension 2 of base-plate 1, and the similar extension of the transmission cover. Holes 82, 83, 84 and 85 of the cover and of the base-plate will let the bolts through that will fasten into the threads of the corresponding holes of the cylinder block.

Fig. 7 illustrates the type of cylinder used and all subsidiary valves and other parts. The cylinder proper is at 86, and it contains a piston 87 made of one piece with the piston rod 88. The piston does not have to be fluid-tight, therefore, expansion rings are unnecessary. The front end of the cylinder is removable for the obvious necessity of boring the cylinder during construction, as well as for assembling necessity. The rear end of the cylinder lets the piston rod through to the adjacent compartment 81, but is provided with a packing chamber 89 in which the packing material is compressed by screw 90 shown at Fig. 8.

The piston rod terminus is attached to the appendix 79 of the shifter-carrier plate. An expansion spring 91 is interposed between the piston and the rear end of the cylinder, this spring serving the purpose of returning the piston, the rod and the shifter-carrier plate to the forward position.

The fluid under pressure is admitted to the cylinder through inlet-port 92 by conduit 93, which is attached thereto with tight fitting nut 94.

Outlet port 95 lets the fluid into escape-conduit 96, which is provided with other ports 97, 98 and 99. These ports are accurately spaced along the cylinder in relation to the displacement of the piston at the different speeds.

Port 95 is in line with the piston when the latter is at its forwardmost position, that is, at the transmission low speed; port 97 is in line with the piston when the latter is in the position corresponding to the intermediate speed of the transmission; port 98 is in line with the piston at the high speed of the transmission or rearmost position of the piston; port 99 is never reached by the piston and serves as an opening for the free circulation of the fluid.

Ports 95 and 97 are provided with adjusting needles 100 and 101 set into respective leak-proof fittings 102 and 103. By means of said needles the escape of fluid through ports 95 and 97 may be regulated so that the change of speeds into the transmission may take place at certain values of acceleration of the vehicle to suit individual preference, of course within reasonable limitation.

On the cylinder side opposite to port 98 is a pressure valve 104, the function of which is to supplement port 98 into discharging the excess pressure of the fluid at the higher speeds of the vehicle. A general discharge opening 105 will lead the fluid into return conduit 106, the latter being attached to the cylinder by means of tight fitting nut 107. At the low pressure of the fluid, which corresponds to the low speed of the vehicle, piston 87 will not be displaced on account of enough fluid being able to escape at such low pressure through outlet port 95 and the leakage around the piston. The fluid that runs into escape conduit 96 will join the leaked fluid behind the piston through ports 97, 98 and 99, thence to be discharged into return-conduit 106.

At a higher pressure of the fluid, corresponding to an increased speed of the vehicle, the fluid admitted into the cylinder will not all be able to escape through outlet port 95, and the piston leakage, therefore it will press the piston rearwardly against the tension of spring 91 until it will reach port 97 where the fluid pressure will balance the spring tension as long as that pressure will not increase further. With a further increase of the speed of the vehicle, the fluid pressure will proportionately increase, and the piston yielding to said pressure will uncover ports 98 and valve 104 where again the fluid pressure and the spring tension will balance each other. The piston cannot go any farther back as its span of displacement terminates there. When the vehicle travels at high speed the fluid pressure will not augment substantially due to the additional abundant escape afforded by valve 104, which will automatically open as a result of said pressure reaching a critical point.

Return-conduit 106 leads the fluid to reservoir 108 shown by Fig. 9 admitting said fluid into the same at a point near its top. Such reservoir is placed in a location easily accessible to the operator so that he may refill it with fluid from time to time. A cap 109 is removable for that purpose. A feed-conduit 110 carries the fluid from the bottom of the reservoir to a gear-pump 111, which will cause the fluid to circulate and will give it the necessary pressure to operate the cylinder above described.

The location of this gear-pump is on the rear of the free-wheeling casing 112 as shown in Fig. 7. Part of casing 112, the bearings 113 and 114, and the pump cover 115 are shown in sectional view. Only the driving gear 116 of the pump is visible, the other gear being totally shielded from view. The operative connection is made with a perpendicular shaft 117, a helical gear 118, and a worm gear 119, the latter being in constant mesh with the helical gear and turning with the driven shaft of the transmission. The perpendicular shaft 117 is journalled within the two bearings 113 and 114 in such a fashion as to allow a certain axial play to said shaft. A one-way coupling is provided at 120 between shaft 117 and the aligned hub 121 of gear 116. This coupling causes the gear pump to operate when the vehicle is running in any forward speed, but when said vehicle is going in reverse speed the driven shaft of the transmission turns in the direction that will cause the worm gear 119 to lift the helical gear 118 by reason of the friction between the two and the free upward play allowed upon shaft 117. The coupling 120 will thus be disconnected, causing the gear-pump to remain idle instead of running the reverse way.

The connection of the conduits to the pump and to the reservoir are all made with tight fitting nuts as described for the connections to the cylinder.

The casing 112 of the free-wheeling clutch has a cover 122 which holds in known manner the pivot of a swinging fork. Such fork is generally used to set the clutch for the eventual free-wheeling run or to cause the rigid coupling that will eliminate free-wheeling. Neither fork nor clutch are shown, but the pivot which is keyed to the swinging fork is brought outside of the cover in the form of a shaft that will make possible the operation of said fork by connecting it to a lever. The end of said shaft is at 123, and a lever 124 is rigidly secured thereto.

The cylinder block shown in the same figure is provided at its rear end with a double bracket 125. A rocker lever 126 has its fulcrum-pin 127 set in said bracket, and the shorter arm of said rocker-lever engages the swinging extremity of lever 124 within an indentation 128. The longer arm of rocker-lever 126 has about midway of its length an oblong slot 129. This slot serves the purpose of loosely holding pin 130, thus connecting push-rod 131 to the movements of rocker-lever 126. Push-rod 131 passes through a packing nut 132 into compartment 81 of the cylinder block and operates back and forth the wedge shaped piece 133. The inclined surface of this piece is in contact with a similarly inclined surface of anchoring member 134. The latter covers all the length of compartment 81, therefore it can only move vertically as the wedge-piece slides horizontally. Resilient spring 135 and 136 will cause a sure drop of the anchoring piece as soon as the wedge-piece is drawn backwards.

When the anchoring piece 134 is lifted one of the four notches 137, 138, 139 or 140 will catch upon the lower tip of the shifter-carrier appendix 79, and as long as it is held lifted, the speed ratio of the transmission which has thus been caused to be locked will be maintained regardless of the intervening changes in the speed condition of the vehicle. Said four notches correspond respectively to the low speed, the neutral, the intermediate speed and the high speed positions of the transmission.

Now, assuming that the vehicle is running at high speed and is about to descend a steep grade, the operator may choose to couple the free-wheeling which will result also in locking the high speed ratio. The operation is simply that of manipulating a handle or pulling a knob on the dash-board, which by a cable or rod connection, will cause rocker lever 126 to swing forward.

If the operator wishes to descend the steep grade in intermediate speed, he will slow down the car by applying the wheel-brakes just enough for the transmission to set itself into intermediate speed, then he will proceed to set the transmission lock and the rigid coupling of the free-wheeling clutch.

If he wishes to make the descent in low speed, he may still further slow down the vehicle, set the transmission in low speed by using the manual lever 14, then lock transmission and free-wheeling.

The notch 138 for the neutral position is useful for locking the transmission shifting mechanism when the transmission is set in the reverse speed, which operation takes place automatically due to the standard method of connecting the shifting movement of the reverse gear to the movement of the means for coupling the free-wheeling clutch.

Having thus completed my description, I claim as my invention:

1. In a gear transmission, a shifting mechanism comprising a universal shifter-pin; a base-plate having a zig-zag cut-out pattern restraining the movements of the shifter-pin; fork carrying members slidably supported by said base-plate; slidable members similarly supported by said base-plate moving counterwise to the adjacent fork-supporting member due to a reversing connection employed thereto; and a catch for each slidable member upon which the universal-pin will engage for the successive operation of the same slidable members.

2. In a gear transmission a shifting mechanism comprising two plates adapted to slide in the crosswise direction respective to each other; a shifter-pin secured to one of said sliding plates; a base-plate having a zig-zag cut-out pattern restraining the movements of the shifter-pin; slidable members supported by said base-plate carrying the shifting forks for effecting the different speed connections within the transmission; a slidable member similarly supported moving counterwise to the adjacent fork-carrying member through a reversing connection; and a receptacle for each slidable member adapted to catch the shifter-pin as the latter successively operates the same slidable members.

3. In a gear-transmission a shifting mechanism comprising a universal shifter-pin; a base-plate having a zig-zag cut-out pattern restraining said shifter-pin to a step-down or step-up movement; three slidable plates supported by said base-plate, two of which carry the shifting forks, and the other is operatively connected to one of the former through reversing means whereby the H movement of the first two plates is converted into a step-down or step-up movement for the three plates as they are operated in succession by the aforesaid universal shifter-pin.

4. In a gear transmission a shifting mechanism comprising a primary slide-plate carrying a secondary plate adapted to slide in an oblique crosswise direction; a shifter-pin secured to the secondary slide-plate; a base-plate having a zig-zag cut-out pattern restraining the movements of the shifter-pin; fork carrying members operated by the said shifter-pin and slidably supported by said base-plate; and an extra slidable member similarly operated by said shifter-pin and supported by said base-plate, the function of which is to reverse the movement of the adjacent fork-carrying member through a connection of racks and gear.

5. In a gear transmission a shifting mechanism comprising a base-plate having a zig-zag cut-out pattern; three slidable plates supported by said base-plate; a shifting fork attached to each of two of the said slidable plates; a reversing connection between the third slidable plate and one of the two fork-carrying plates; a depression for each slidable plate adapted to lodge intermittently a shifter-pin guided by the zig-zag cut-out pattern; an oblique cross-slide base for said shifter-pin; a main sliding carrier-plate supporting said oblique cross-slide base, and means to operate said sliding carrier-plate in one direction or the opposite.

6. In a gear transmission a shifting mechanism comprising a multiple-slide universal shifter, a base-plate having a zig-zag cut-out pattern for restraining the movements of the universal shifter to a step-down or step-up displacement; three parallel slidable plates supported by said base-plate, of which the first two slidable-plates carry the shifting forks effecting the different speed connections, and the third slidable-plate is operatively connected to the second plate by means of racks and gear whereby the return movement of the second plate occasioned by the high-speed connection of the transmission is obtained by the operation of the universal shifter upon the third slidable-plate without reversing the direction of said shifter.

7. In a gear transmission an automatic shifting mechanism comprising a base-plate having a zig-zag cut-out pattern; three slidable plates supported by said base-plate; a shifting fork attached to each of two of the said slidable-plates; a reversing connection between the third slidable-plate and one of the two fork-carrying plates; a shifter-pin guided within the zig-zag cut-out pattern, and successively operating said three slidable-plates; an oblique cross-slide base to which said shifter-pin is secured; a main sliding carrier-plate supporting said oblique cross-slide base, and means to automatically operate said sliding carrier-plate in one direction or the opposite, according to the increase or decrease of the speed of the driven vehicle.

8. In a gear transmission an automatic shifting mechanism comprising a master slide-plate carrying a secondary plate adapted to slide in an oblique crosswise direction; a shifter-pin secured to the secondary slide-plate; a base-plate having a zig-zag cut-out pattern designed to restrain the movements of the shifter-pin; fork-carrying members operated by the said shifter-pin and slidably supported by said base-plate side by side of each other; an extra slidable member similarly operated by said shifter-pin and supported by said base-plate, the function of which is to reverse the movement of the adjacent fork-carrying member through a connection of racks-and-gear; and means to automatically operate the aforesaid master slide-plate in one direction or the opposite according to the increase or decrease of the speed of the driven vehicle.

9. In a gear-transmission an automatic shifting mechanism comprising a master slide-plate carrying a secondary plate sliding in the crosswise direction upon the same; a shifter-pin secured to said secondary sliding plate; a base-plate having a zig-zag cut-out pattern restraining said shifter-pin to a step-down or step-up movement; three slidable members supported by said base-plate, two of which carry the shifting forks for setting the different speeds in the transmission, and the other is operatively connected to one of the former through reversing means whereby the H movement of the first two slidable members is converted into a step-down or step-up movement for the three members as they are operated in succession by the aforesaid shifter-pin; and means to automatically displace the above-named master slide-plate in one direction or the opposite, according to the increase or decrease of the speed of the driven vehicle.

10. In a gear transmission a lockable automatic shifting mechanism comprising a base-plate having a zig-zag cut-out pattern; three slidable plates supported by said base-plate; a shifting fork attached to each of two of the said slidable plates; a reversing connection between the third slidable plate and one of the two fork-carrying plates; a universal shifter-pin guided within the zig-zag cut-out pattern and successively operating said three slidable plates; means to automatically operate said universal shifter-pin one way or the other within the zig-zag pattern in relation to the increase or decrease of the speed of the driven vehicle; and locking means with which to cause the shifting mechanism to retain any one of the transmission speeds in indefinite operation coincidentally to the rigid coupling of the free-wheeling clutch of the same transmission.

11. In a gear transmission, a shifting mechanism comprising a universal shifter-pin; a base-plate having a zig-zag cut-out pattern restraining the movements of the shifter-pin; fork carrying members slidably supported by said base-plate; slidable members similarly supported by said base-plate moving counterwise to the adjacent fork-supporting member due to a reversing connection employed thereto; a catch for each slidable member upon which the universal-pin will engage for the successive operation of the same slidable members; and a butterfly-shutter located within the gas intake manifold of the motor linked to the movement of the said fork-carrying members for automatically reducing to minimum the speed of the motor when the transmission is passing through the neutral condition.

12. In a gear transmission, a shifting mechanism comprising a universal shifter-pin; a zig-zag guide for said shifter-pin; fork carrying members effecting the speed connections; means simultaneously moving counterwise to the movement of the adjacent fork carrying member; and a catch for each of said fork carrying and counter moving means upon which the universal shifter-pin will successively engage.

13. In a gear transmission, an automatic shifting mechanism comprising a universal shifter-pin; a zig-zag guide for said shifter-pin; fork carrying members effecting the speed connections; other members associated therewith reversing the movement of the adjacent fork carrying member; a catch for each of said fork-carrying and associated members upon which the universal shifter-pin will successively engage; and means to produce an impulse effecting the displacement of said shifter-pin, said impulse to be relative to the speed of the vehicle.

14. In a gear transmission, a lockable automatic shifting mechanism comprising a universal shifter-pin; a zig-zag guide for said shifter-pin; fork carrying members effecting the speed connections; means simultaneously moving counterwise to the movement of the adjacent fork carrying member; a catch for each of said fork carrying members and counter moving means upon which the universal shifter-pin will successively engage; means to cause the displacement of the aforesaid shifter-pin one way or the opposite upon its guide, said displacing means to derive their impulse from, and in relation of, the vehicle's rate of speed; and locking means with which to cause the transmission mechanism to indefinitely retain any one of the speeds being delivered.

15. In a gear transmission, a shifting mechanism comprising a universal shifter-pin; a zigzag guide for said shifter-pin; fork carrying members effecting the speed connections; means simultaneously moving counterwise to the movement of the adjacent fork carrying member; a catch for each of said fork carrying members and counter moving means upon which the universal shifter-pin will successively engage; and means operatively related to the changing of said speed connections for throttling the motor during the transition upon the neutral condition of the said transmission.

ALDO LAZZARINI.